Aug. 20, 1929.                A. R. RUTTER                1,725,161

METER ATTACHMENT

Filed June 13, 1924

WITNESSES:
R. J. Butler.

INVENTOR
Argyle R. Rutter.
BY
ATTORNEY

Patented Aug. 20, 1929.

1,725,161

UNITED STATES PATENT OFFICE.

ARGYLE R. RUTTER, OF EAST PITTSBURGH, PENNSYLVANIA, ASSIGNOR TO WESTINGHOUSE ELECTRIC & MANUFACTURING COMPANY, A CORPORATION OF PENNSYLVANIA.

METER ATTACHMENT.

Application filed June 13, 1924. Serial No. 719,785.

My invention relates to electric-meter attachments and particularly to attachments for watt-hour demand meters.

One object of my invention is to provide an attachment of the above indicated character that shall permit of ready conversion from one voltage-and-frequency rating to another without change in the attachment, as primarily constructed.

Another object of my invention is to provide an attachment for a demand meter that shall permit the meter to constitute a self-contained unit for operation in connection with circuits of different voltage-and-frequency relations.

In integrating instruments, such as watthour meters having demand attachments, space factors and wire sizes limit the motors, for periodically resetting the demand-indicating members, to predetermined voltage-and-frequency ratings.

It is desirable to limit the variety of sizes of the resetting motors, to thereby, permit a self-contained meter of a given size to operate in circuits of different voltage values.

Heretofore, changing the voltage-and-frequency rating of the resetting motor has been accomplished by the cumbersome and expensive expedient of providing additional apparatus exterior to the meter. This apparatus requires additional space, which may not be available in the immediate vicinity of the meter and which may be required for other purposes. The variable factor entering into the use of an auxiliary device of this kind, that is not a part of a unitary meter structure, also renders the installation wiring thereof of uncertain and, sometimes, of undesirable nature.

It is my aim to overcome the above-mentioned objections, incident to adapting a watthour-demand meter to circuits having different voltage-and-frequency relations, by providing an attachment that may be so received inside the meter casing as to render the meter a self-contained unit. The attachment is adapted to occupy space in the meter casing that is normally unused and that could not be utilized to increase the voltage-and-frequency rating of the resetting motor by increasing the size of the motor winding. Thus, a self-contained meter unit is provided and adapted for circuits of various voltage-and-frequency ratings without recourse to the employment of apparatus exterior to the meter casing.

Figure 1:
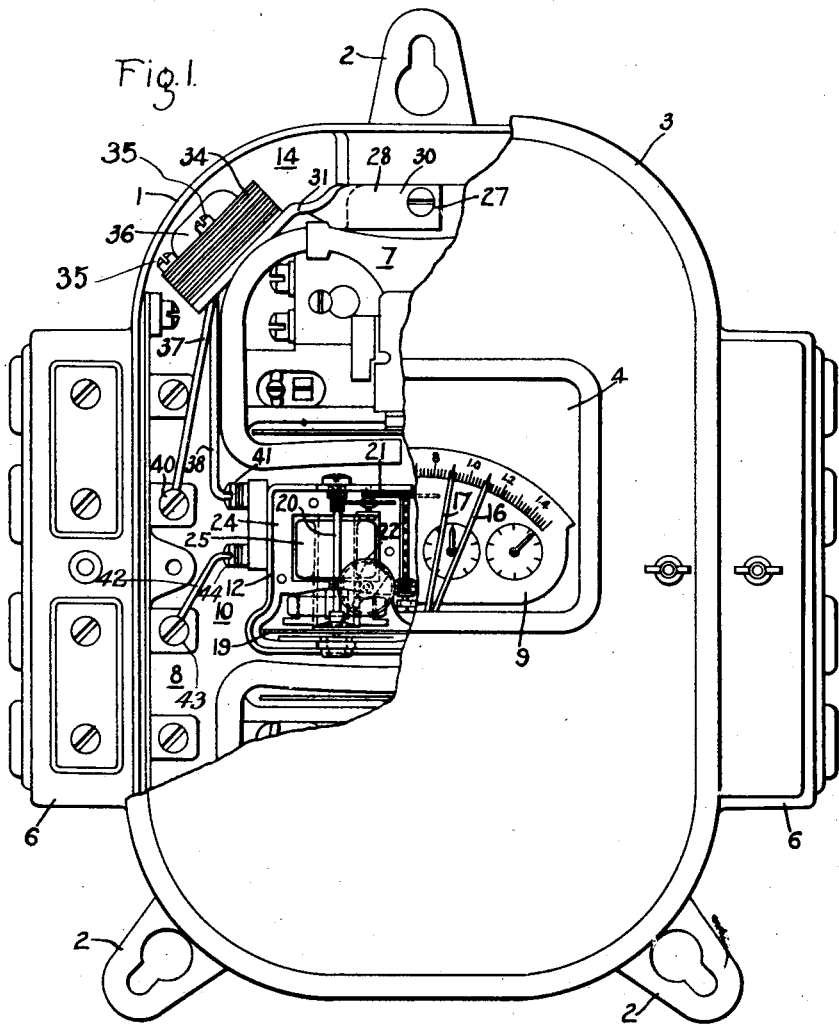
Figure 2:
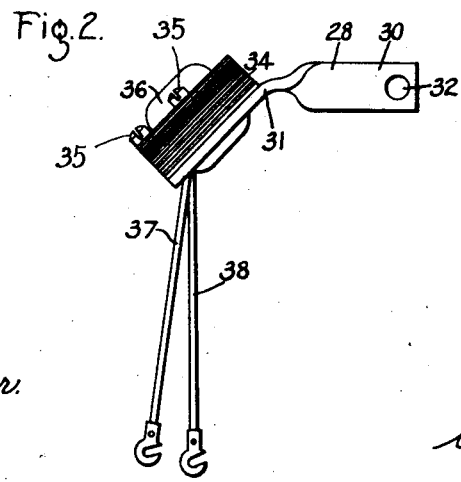

Figure 1 of the accompanying drawings is a front elevational view (parts being broken away) of a watthour-demand meter embodying my invention, and Fig. 2 is a detail view of an attachment, shown also in Fig. 1, whereby the demand mechanism of the meter may be operated in a circuit of different voltage-and-frequency rating from the normal rating thereof.

The meter shown is merely illustrative of one of several standard meters to which my invention may be applied, in this instance being representative of an alternating-current watthour meter. Since the details of construction and operation of the particular meter employed do not all enter into my invention, only those parts which are necessary to a full and complete understanding of the invention are set forth.

In general, the meter comprises a supporting base member or shell 1 having apertured supporting legs 2, a front casing or cover 3, a window 4, in the casing 3, terminal housings or boxes 6 on the sides of the base member 1, meter elements 7 and 8 for connection to different phases of a polyphase circuit, an integrating mechanism—the dial 9 only of which is shown—for measuring total energy consumption, a demand attachment 10 for operation by the elements 7 and 8, an auxiliary motor 12 for periodically resetting the demand attachment 10, and an attachment or auxiliary device 14 for changing the motor 12 from one voltage-and-frequency rating to another.

The construction and operation of the meter elements 7 and 8 are well known in the art and description thereof is not deemed necessary.

The demand attachment 10, which is fully shown and described in copending application Serial No. 439,327, filed Jan. 24, 1921, by W. G. Mylius for a maximum demand meter, now Patent No. 1,580,523, issued April 13, 1926, and assigned to the Westinghouse Electric & Manufacturing Company, comprises a driven or maximum pointer 16 that is frictionally relatively movably mounted on a shaft (not shown) and adapted to be driven by a driving pointer 17 that is fixed to that shaft. The latter is driven by the meter elements 7 and 8 through a gear train, in which a disconnection of certain of the gears thereof is periodically effected by the motor 12, as fully shown and described in the aforesaid co-pending application.

As shown in the drawings, the motor 12 comprises a rotatable-disk armature 19, a shaft 20 on which the armature 19 is mounted, sets of gear trains 21 and 22 for effecting the disconnection of the gear train, above mentioned, between the meter elements 7 and 8 and the pointers 16 and 17, a field-magnet structure 24 for providing the actuating flux for the armature 19 and a voltage coil 25 for energizing the field-magnet structure 24.

By reason of space factor and limits of wire size, it is not feasible to construct the voltage coil 25 larger than a certain size in relation to the other parts of the meter, which is of standard stock construction. However, it is desirable to adapt the meter as a self-contained unit for operation in circuits of different voltage-and-frequency ratings, and it is this feature of the device to which my invention more particularly appertains.

To so adapt the meter, the latter is adapted to receive the attachment or impedance device 14 which is constructed to occupy a relatively small space in the upper portion of the meter casing. It is to be understood that the device 14 is equipment which is preferably placed on the meter, when first installed, but which if not placed thereon then may subsequently be added, if it becomes necessary to operate the motor 12 on a circuit of different voltage-and-frequency relation.

Accordingly, a tapped opening is provided in the base member 1 for the reception of a screw 27 that holds the attachment 14 in position.

The attachment 14 comprises a supporting bracket 28 having angularly-related arms 30 and 31, the former of which is provided with an opening 32 for the reception of the screw 27, and the latter of which is adapted for the reception and support of a laminated core member 34. Screws 35 secure the core member 34 to the bracket 28.

A coil 36 is mounted on the core member 34 and is provided with conducting leads 37 and 38 for attachment, respectively, to an outlet terminal 40 and to a terminal 41 leading to the voltage winding 25 of the motor 12. A conducting lead 42, between an outlet terminal 43 and a motor terminal 44, completes the circuit of the motor. This construction places the impedance device 14 in series with the voltage winding 25 and adapts the motor 12 for operation in circuits of different voltage-and-frequency relations than those for which the motor alone is adapted.

By my invention, the use of apparatus and connections exterior to the meter casing, with the attending complication, expense and likelihood of damage, are avoided and a compact, self-contained meter unit for operation in circuits of widely varying voltage and frequency relation is obtained.

Further, the attachment is protected by the meter casing and the operations of shipping and installing the instrument are facilitated to a high degree.

While I have shown and described a particular form of my invention, changes may be made therein without departing from the spirit and scop thereof, as set forth in the appended claim.

I claim as my invention:

In a self-contained meter-unit structure, the combination with a meter element, a demand-indicating member actuated thereby, an electric motor for periodically resetting the indicating member and a casing enclosing all of said elements, of a removable-unit impedance device in the casing for changing the voltage-and-frequency rating of the motor comprising a core member, a bracket having an arm for supporting the core member and an arm for attachment to the casing, a winding for the core member, and leads for connecting the winding to the motor.

In testimony whereof, I have hereunto subscribed my name this 27th day of May, 1924.

ARGYLE R. RUTTER.